(12) United States Patent
Turchetta et al.

(10) Patent No.: US 7,719,589 B2
(45) Date of Patent: May 18, 2010

(54) IMAGING ARRAY WITH ENHANCED EVENT DETECTION

(75) Inventors: Renato Andrea Danilo Turchetta, Didcot (GB); Mike Towrie, Didcot (GB); Jamie Crooks, Didcot (GB)

(73) Assignee: The Science and Technology Facilities Council, Oxfordshire (GB)

( * ) Notice: Subject to any disclaimer, the term of this patent is extended or adjusted under 35 U.S.C. 154(b) by 613 days.

(21) Appl. No.: 11/628,163

(22) PCT Filed: Jun. 2, 2005

(86) PCT No.: PCT/GB2005/002175

§ 371 (c)(1),
(2), (4) Date: Nov. 30, 2006

(87) PCT Pub. No.: WO2005/120046

PCT Pub. Date: Dec. 15, 2005

(65) Prior Publication Data

US 2008/0106622 A1    May 8, 2008

(30) Foreign Application Priority Data

Jun. 2, 2004    (GB)    ................... 0412296.6

(51) Int. Cl.
*H04N 3/15* (2006.01)
*H04N 5/335* (2006.01)
*H04N 5/32* (2006.01)
(52) U.S. Cl. ..................................... 348/308
(58) Field of Classification Search ................ 348/294, 348/302, 308; 257/292
See application file for complete search history.

(56) References Cited

U.S. PATENT DOCUMENTS

| 5,107,122 | A | * | 4/1992 | Barkan et al. | ............... 348/294 |
| 5,461,425 | A | | 10/1995 | Fowler et al. | |
| 5,471,515 | A | | 11/1995 | Fossum et al. | |
| 5,565,915 | A | * | 10/1996 | Kindo et al. | ................. 348/308 |
| 5,693,932 | A | * | 12/1997 | Ueno et al. | ................. 348/308 |
| 5,801,657 | A | | 9/1998 | Fowler et al. | |
| 5,856,667 | A | | 1/1999 | Spirig et al. | |
| 5,909,026 | A | | 6/1999 | Zhou et al. | |
| 6,069,377 | A | * | 5/2000 | Prentice et al. | ............. 257/292 |
| 6,229,133 | B1 | | 5/2001 | Hynecek | |

(Continued)

FOREIGN PATENT DOCUMENTS

EP    0 675 345 A2    3/1995

(Continued)

OTHER PUBLICATIONS

Kleinfelder et al. IEEE Journal of Solid-State Circuits, vol. 36 No. 12, (2001), pp. 2049-2059.

*Primary Examiner*—Jason Whipkey
(74) *Attorney, Agent, or Firm*—Birch, Stewart, Kolasch & Birch, LLP

(57) ABSTRACT

An imaging device comprising an array of pixels fabricated using a microelectronic technology such as CMOS is disclosed. The imaging device provides information regarding rapid increases in incident radiation. The sensor is sensitive to a variable quantity to be imaged, such as visible or non-visible radiation, and a signal representative of the quantity is output. The quantity is measured over a monitoring period, and the timing of the incidence may also be output.

19 Claims, 9 Drawing Sheets

U.S. PATENT DOCUMENTS

| | | |
|---|---|---|
| 6,525,304 B1 | 2/2003 | Merrill et al. |
| 6,590,610 B2 * | 7/2003 | Castro et al. ............... 348/297 |
| 6,660,989 B2 * | 12/2003 | Guo et al. ................... 348/308 |
| 6,707,410 B1 | 3/2004 | Bock |
| 7,202,898 B1 * | 4/2007 | Braun et al. ................ 348/308 |
| 7,362,365 B1 * | 4/2008 | Reyneri et al. ............. 348/308 |
| 2001/0012068 A1 * | 8/2001 | O'Connor ................... 348/294 |
| 2002/0067417 A1 | 6/2002 | Tan et al. |
| 2003/0058360 A1 | 3/2003 | Liu et al. |
| 2003/0081134 A1 * | 5/2003 | Luo et al. ................... 348/308 |
| 2003/0189657 A1 * | 10/2003 | Hammadou ................. 348/294 |
| 2004/0012687 A1 | 1/2004 | Ohki |
| 2004/0036643 A1 * | 2/2004 | Bock .......................... 348/308 |
| 2004/0109074 A1 * | 6/2004 | Jung .......................... 348/308 |
| 2004/0263654 A1 * | 12/2004 | Lee et al. ................... 348/302 |
| 2005/0104983 A1 * | 5/2005 | Raynor ....................... 348/294 |

FOREIGN PATENT DOCUMENTS

| | | |
|---|---|---|
| EP | 0 675 345 A | 10/1995 |
| EP | 0 749 234 A1 | 12/1996 |
| EP | 1 107 581 A3 | 6/2001 |
| JP | 2001-54022 A | 2/2001 |
| JP | 2004-117277 A | 4/2004 |
| WO | WO-95/22180 A1 | 8/1995 |

* cited by examiner

IMAGING ARRAY WITH ENHANCED EVENT DETECTION

This invention relates to an imaging device, in particular to an imaging device comprising an array of pixels fabricated using a microelectronic technology such as CMOS.

There are a number of types of imaging devices including charge coupled devices (CCD), photodiodes, and charge injection devices. CCD's in particular have a number of advantages which make them particularly suitable for imaging devices. CCD's work by storing the charge generated by radiation on the imaging device and then transferring the charge to an output stage, located on the periphery of the silicon substrate. Although CCD's provide good image quality, they are limited in the amount of processing they can perform and their performance falls off at high speed due to the inherently serial process and the need for a high bandwidth output stage. In addition, the standard CCD is incompatible with CMOS processing which means that it is difficult to fabricate on-chip electronics for processing the CCD signals.

In the early 1990's a new architecture was developed which is fully compatible with CMOS. This is known as active pixel sensor (APS) architecture and is described, for example, in U.S. Pat. No. 5,471,515. The basic APS architecture is shown in FIG. 1 of the accompanying drawings, and can be fully fabricated in CMOS.

FIG. 1 shows the circuitry associated with a single pixel 1 of a pixel array forming part of an imaging device suitable for imaging electromagnetic radiation. Each pixel comprises a sensor, such as a photodiode or photogate (a photodiode PD is illustrated) together with a small number of MOS transistors for processing the signal output from the sensor. Typically, these comprise a reset transistor MRST connected in series with the photodiode PD between the supply lines, a source follower transistor MIN which receives at its gate electrode the output of the photodiode PD, and a pixel select transistor MSEL which receives the output from the source follower transistor MIN, and selectively passes it to an output terminal 3 which is connected to a column bus (not shown). A current source $I_{bias}$, located outside the pixel, provides operating current for the source follower.

The reset transistor MRST is used to reset the photodiode PD to the positive supply voltage or to other, user-controlled, positive voltage. Following a reset, radiation incident on the photodiode PD results in a corresponding reduction in potential at the gate of the source follower transistor MIN in accordance with the strength of the radiation. All of the outputs of the pixels in a column are connected to a common column bus, but only one pixel at a time is selected in each column, using the switching action of the pixel select transistor MSEL which receives a switching signal at terminal SEL which is passed to its gate to switch the transistor on and off. Usually switching is controlled in such a way that all of the pixels in each row of the array are read out simultaneously in parallel, the signals from each pixel being passed to a respective column bus for passage to external circuitry (not shown) which carries out the signal processing.

More recently still, the APS circuit is output to an on-pixel ADC (analogue to digital converter) which converts the analogue output of the APS circuit into a digital code which is stored in an on-pixel memory for later readout. An example of such an arrangement is described in a paper entitled "A 10000 Frames/s CMOS Digital Pixel Sensor" at page 2049 of IEEE Journal of Solid-State Circuits, Vol 36, No 12. The basic digital pixel sensor (DPS) design is illustrated in FIG. 2, to which reference will now be made.

As before, the circuit of FIG. 2 represents that of a single pixel 1 within an array of pixels. The analogue part of circuit comprises a photodiode PD, a reset transistor MRST which have the same functions as described above, and a transfer transistor Tx which acts to selectively transfer the signal at the cathode of the photodiode to an ADC in the form of a ramp-driven comparator 2. The reset transistors and transfer transistors in each pixel are switched from reset and row transfer lines 9 and 8 respectively, both of which are common to all pixels in the array.

The comparator 2 has two inputs: a first input for receiving the analogue signal from the photodiode PD via a transfer transistor Tx, and a second input to which is applied a continuously cycling ramp voltage $V_{ramp}$ from a common line 10. The comparator performs a ramp-ADC and changes its output state at a time representative of the amplitude of the analogue signal from the photodiode. This change of state is passed to a disable input of an n-bit register 3, where n=8 by way of example. The 8-bit D input of the register 3 receives a continuously cycling value which is coded by a digital code, for example the Gray code. The digital code is applied via a common 8-bit data bus 4 from a common Gray code generator (not shown). One cycle of the output of the Gray code generator, represented as an analogue waveform, is illustrated in FIG. 4C, and will be seen to comprise a reset from a high level to a low level, followed by a ramp which rises in $2^n$ steps back to the high level. In the present example the ramp would comprise $2^8=256$ steps but a lesser number than this is shown, for clarity. An 8-bit representation of this waveform is applied to the 8-bit bus 4 and thus to the 8-bit D input of each of the registers 3 in the pixel array. The rising digital value on the bus 4 is written to the register at each clock pulse until the register receives a signal at its disable input from the output of the comparator 2. This disables the register for the rest of the cycle and the value held in the register is thus the last value which was written. This value is stored in the register until it can be read out.

Thus, it will be seen that, if the continuously cycling $V_{ramp}$ signal is synchronised with the Gray code cycling signal then the digital value stored in the register 3 is representative of the amplitude of the analogue output of the photodiode PD integrated over the integration period.

Data is read out from the 8 bit Q output of the register 3 onto an 8-bit column data bus 5 via a switch $S_{sel}$ which is controlled by a signal along the dotted line 6. Since, in practice, all pixels in a row are read out simultaneously the read signal applied to switch $S_{sel}$ is also simultaneously applied to the corresponding switches in the other pixels in the same row, via a row read line 7. In practice, of course, the switch $S_{sel}$ is realised in CMOS.

A timing diagram, illustrating the events occurring over a full frame, is shown in FIG. 3. The frame commences with the application of a common reset voltage rst to the cathode of the photodiode PD. This is achieved by switching the transistors $T_x$ and MRST on simultaneously from their respective control lines 8 and 9 which applies to the photodiode cathode the supply voltage $V_{DD}$, or some other user-controlled positive voltage. The transistors $T_x$ and MRST are now switched off to start the integration phase, during which radiation received by the photodiode PD acts to reduce the voltage by an amount dependent on the amount of radiation received during the integration phase. At the end of the integration phase, the transfer transistor $T_x$ is again briefly switched on to transfer the voltage at the photodiode cathode to the node 11, and hence to the input of the comparator 2. In practice the voltage transferred to node 11 will probably be affected by charge sharing as between the capacitance of the photodiode and the capacitance at node 11, this latter being due to stray capacitance and the input capacitance of the comparator 2. This effect will be assumed to take place, to a greater or lesser extent, in the various circuits to be described herein; however it will be understood by those skilled in the art that the voltage transferred to node 11 will be representative of the charge on the photodiode PD which in turn is representative of the amount of radiation received by the photodiode over the integration period. The transistor $T_x$, having switched off again, the node 11 is floating, and its stray capacitance holds the transferred value for sufficiently long for the comparator 2 to act upon it; if necessary a physical capacitor can be added here to ensure that the value is held for sufficient time.

FIG. 4 illustrates the operation of the comparator 2 and register 3 over a single ADC phase, which follows the integration phase. FIG. 4B represents the variation over the ADC phase, of the $V_{ramp}$ signal on line 10. the voltage at node 11 is represented by the horizontal line $V_{11}$. FIG. 4C represents the output from the comparator which will be seen, in this example, to have been latched to a logic 1 level at the beginning of the ADC phase. As the voltage $V_{ramp}$ crosses the voltage $V_{11}$ the output of the comparator changes state from 1 to 0.

At the moment at which the comparator output changes state from 1 to 0, the register is disabled as explained above, and stores the Gray coded register value in the register at that instance of time.

It will be seen that, for an 8-bit register, the ADC phase thus lasts for 256 clock cycles which typically corresponds to a time period of about 6 µs.

The final phase in each frame sequence is the read phase, during which the pixels in each row are read in turn in the manner described above until the whole array of pixels has been read. The frame sequence then repeats in a cyclic manner.

The lower part of FIG. 3, indicated by the "eye" symbol, represents the period when the sensor is blind to the incident radiation (shaded areas), and when it sees the radiation (clear area).

It will be seen that the voltage amplitude transferred to node 11 at the end of the integration phase is representative of the integral of the radiation incident on the photodiode over the whole of the integration period. It gives no information as to how the radiation changes over the period—for example whether the radiation is a steady value over the period, or whether it is subject to a sudden increase, such as might indicate the occurrence of an external event such as a charged particle or photon splash incident on the photodiode.

The present invention seeks to provide an imaging device in which information as to increases, primarily rapid increases, of incident radiation during the integration period of the photodiode in each pixel can be detected. Such information can then be used, for example, to enable the timing of such increase to be measured. Another application might be to provide an indication as to whether a particular pixel needs be read out during a particular frame: if no rapid increases are detected to have occurred during the integration period, it may be safe to skip that pixel during the readout of that frame, thus potentially reducing the frame period (and enabling a faster frame rate), as well as improving the ratio of "blind" to "seen" time in the operation of the pixel array (see above).

According to the invention there is provided an imaging device comprising an array of pixels in which, for each pixel, there is provided:

a sensor which is sensitive to a variable quantity to be imaged and for outputting a signal representative of the variation in said quantity during a monitoring period;

a comparator having a first input and a second input;

means for connecting the output of said sensor to said first input in such a way that said comparator continuously monitors said Output signal; and means for applying a reference voltage to said second input;

said comparator being such as to change its output state at the point in time at which the amplitude of said output signal crosses said reference voltage level.

The quantity to be imaged may be any quantity which may be imaged and is susceptible to being measured by a sensor to produce a signal representative of the variation in the quantity. Examples are radiation, particularly electromagnetic radiation including X-ray radiation, and also including charged particle radiation, (e.g. electron radiation), neutron radiation, and electric potentials or time variation of electric potentials.

The invention is particularly useful in the detection and measurement of sudden external events, such as the detection of individual electrons or bursts of photons or particles but it is not limited to this use.

The sensor may be any device suitable to provide an output which is sensitive to the variable quantity to be imaged. A common application will be in the detection of electromagnetic radiation, both visible and non-visible (for example in the infrared or ultraviolet domain). The use of a converter layer put in front of the sensor will also improve its efficiency in detecting shorter wavelengths, like X- or gamma-rays, as well as neutrons. The sensor could also be made so that it is highly, possibly fully, efficient to charged particles. Static or dynamic electric potentials could also be imaged. For the sake of simplicity, it will be assumed herein that the radiation to be detected is visible light and, for this purpose, a photodiode or phototransistor is suitable.

The reference voltage applied to the second input of the comparator may be a d.c. voltage which remains unchanged over time. Thus if during the monitoring period, there is a sudden increase of radiation incident on a particular pixel, this will be reflected as a sudden change in the amplitude of the sensor output signal which, provided that the reference voltage is set to an appropriate level, can be detected as described above by the comparator, and appears as a change of state of the comparator output. The word "hit" is used herein as a shorthand way of indicating the occurrence of an external event which is detected by the sensor and causes the output of the comparator to change state. Of course, it is quite possible, in any single monitoring period, that no hit will occur.

It will be understood that the point in time at which the amplitude of the sensor output signal crosses said reference voltage level represents the timing of the hit with respect to the beginning of the monitoring period. Thus it will be seen that the output of the comparator provides two corresponding pieces of information: first that a hit has occurred and secondly the timing of that hit with respect to the beginning of the monitoring period. Both these pieces of information can be used, together or separately, in the subsequent circuitry.

Thus, in one embodiment, the output from the comparator is stored in a memory means as a value, conveniently a digital value, representative of the timing of the hit. This can be realised in a manner somewhat similar to that described above, namely by using a counter to generate a constantly changing value—increasing or decreasing from a known reset value—which can be stored in the memory means in the event of a hit in the manner described above. This changing value continuously cycles, being reset at the beginning of each monitoring period. Thus, during the monitoring period, the output from the counter changes in steps over the course of the period for example using the Gray code as described above. The occurrence of a change of state of the comparator output disables the memory means so that the digital value at that instance of time is stored in to the memory until it can be read out.

It is anticipated that, once a hit has been detected, the continuous monitoring of the sensor output will cease for the rest of that frame. This means, however, that only a single hit can be detected in each frame period which may be sufficient for most applications, but, where the ability to detect more than one hit per frame is required, the imaging device can be modified to include multiple memories so that the timings of multiple hits within a monitoring period can be stored in separate memories. In addition, means are required to reset the pixel immediately after each hit, this in itself requiring a short period—typically 1 μs—during which the pixel is "blind". The cycling digital value (Gray code) applied to the memories could also be reset at each hit, or it could be left alone, in which case all detected hits will be timed with respect to the reset at the beginning of the frame.

It will be seen that the pixel circuitry described above will be capable of providing an accurate timing of relatively large increases in radiation which cause a steep change in the potential at the second input to the comparator. However, if the change is not so steep, representative of radiation of lower intensity, but is nevertheless sufficient to eventually reach the level of the reference voltage, then the comparator will still output a signal representative of the timing of the event, but the measurement will have an inferior resolution to the case where the change in potential is steep. To counter this, the reference value may be such as to change with time in such a direction as to meet the changing potential of the sensor output signal. For example if, during the monitoring period, the sensor output falls from a high at the beginning of the period, the reference voltage can be such as to rise to meet the falling sensor output potential, thus bringing forward in time the point at which the state of the comparator output changes. Clearly this change has to occur in a known manner so that the subsequent circuitry can appropriately analyse the result; for example the reference voltage can change linearly, logarithmically or in some other manner. Preferably, however, the reference voltage is changed according to a law which tends towards making incident radiation having a particular value in intensity space have the same value as its corresponding value in time space. In this way, the resolution of the device can be made substantially the same whatever the intensity of the incident radiation.

It has already been noted that the invention is directed towards detecting whether, during a particular monitoring period, there are any hits and, if so, the timing of those hits with respect to the beginning of the period. This is distinct from the pixel described in relation to FIG. 2, in which what is measured is a signal whose amplitude is representative of the output of the photodiode over a monitoring period—usually referred to as the integration period—and which in turn is representative of the amount of radiation incident on the photodiode over that period.

It is often the case that both these pieces of information are useful and accordingly, in a further embodiment of the invention, means are provided to selectively apply to the second input of the comparator a constant reference voltage or a cyclic ramp voltage and switch means are provided at the output of the comparator to direct the comparator output either to a first memory means operable to receive a value representative of the timing of the crossover of said comparator, or to a second memory means operable to receive a value representative of the amount of radiation incident on the sensor over an integration period. Thus it will be seen that the pixel can be switched from "timing" mode to "amplitude" mode, and vice versa. Timing circuitry, external to the pixel array, controls the operation of the switch.

The timing of such a circuit can be arranged in different ways. The most likely is that, following a reset at the beginning of each frame, the pixel is switched to "timing" mode in which the output of the sensor is continuously monitored. If a hit occurs then a digital value representative of the timing of the crossover is stored in the first memory means in the manner described above. At the end of the monitoring period the pixel is switched and the amplitude that the sensor output signal had reached at the end of the monitoring period is applied to the first input of the comparator, whilst to the second input, a ramp voltage is applied, in the manner described above in relation to FIG. 2, which ramp voltage will eventually cross the held voltage at the first input and cause the comparator output to change state at a time corresponding to the amplitude of the held signal. The comparator output is then used to enable and subsequently disable the second memory means to store the amplitude value therein, as earlier described.

The frame continues with readout from the two memory means which can be realised simultaneously or sequentially. When all the memories of all pixels in the pixel array have been read out, the frame terminates, and the whole process starts again with a new frame.

In an embodiment of the invention a hit flag generator can be used to reduce readout time by reading only those pixels which have experienced a hit during the monitoring period. Thus only those pixels which have detected interesting data are read, thus quickening the time taken (for example) to read a full frame of occasional photon splashes. The potentially reduced readout time leads to a corresponding reduction in the frame period, and hence increase in frame rate.

In one embodiment, the hit flag generator takes its input from the output of the comparator—which indicates a hit by a change of state; in an alternative embodiment, it takes its input from the output of the memory means—which will be empty, or written with some default value if there has been no hit.

The output from the hit flag generator is used to control readout circuitry associated with each pixel. In the event that the hit flag is not set, the pixel is not read for that frame, thus saving on readout time. If the hit flag is set, then readout occurs normally from the memory or memories within the pixel.

The hit flag generator may also be used in a more sophisticated manner, for example by generating a hit flag only if the hit occurs within a certain range of times from the beginning of the monitoring period. This is equivalent to gating the signals so that only those hits that occur within a time window get recorded—this could reduce unwanted background noise in some applications. In connection with this, it is desirable to be able to synchronise operation of the pixels to an external source such as a laser, synchrotron or neutron beam. The imaging device can include a trigger device, triggered by such an external source, which would provide simplified timing of external events. Preferably such a trigger device would be synchronised with the imaging device clock so that the operation of the trigger device and the pixel array are synchronised.

In the event that the imaging device also measures the amplitude of the incident radiation, it might also be useful to generate a hit flag based on the amplitude of the incident radiation over the integration period. For example, the hit flag generator might be such as to generate a hit flag only if the amplitude lies between two thresholds—i.e. above a minimum threshold and below a maximum threshold. This could filter the detection of events which were considered to be particularly small—near to the noise floor, or particularly large—for example if it were desired to select single photon events, and reject multi-photon events.

In order that the invention may be better understood, several embodiments thereof will now be described by way of example, only, and with reference to the accompanying drawings in which.

Throughout all of the Figures, common reference numerals have been used to indicate corresponding parts, where appropriate.

Figure 1:
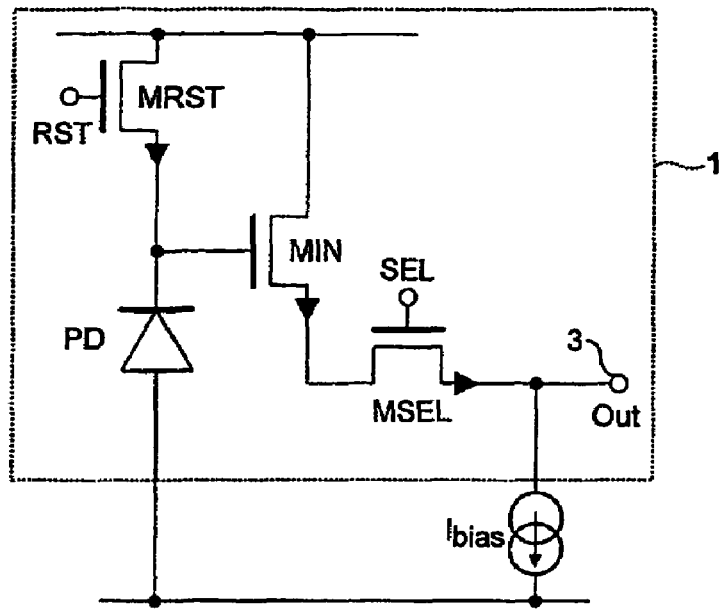
FIG. 1 is a circuit diagram of a known pixel circuit utilising APS architecture.

Each of the embodiments to be described are related to just a single pixel 1 intended to form part of a two-dimensional array of pixels arranged in rows and columns, and forming part of an imaging device. It will be understood that all of the circuit components within the box 1 are associated with the pixel and are physically mounted within the pixel. The only exception to this are the various common lines and buses which pass through the box 1 and serve multiple pixels. The common lines and buses which are present in all of the embodiments are as follows:

1) A reset line 9 which supplies a reset signal rst to switch reset transistor MRST on and thus apply $V_{DD}$ or some other user-controlled positive voltage to the cathode of the photodiode PD. The reset signal is applied globally to all pixels in the array.

2) A reference voltage line 12 which supplies a d.c. level intended to function as a threshold voltage applied to the second input of the comparator 2. It is probable that the reference voltage will likewise be applied globally; however there are circumstances where it might be advantageous to apply different reference voltage levels to different pixels to take account of process variations from pixel to pixel.

3) A n-bit data bus 4 which carries a continuously cycling variable digital value available for inputting to the individual elements of the register 3. This signal has already been discussed above in relation to the prior art circuit of FIG. 2. It is assumed herein that n=8, but this is not essential. The digital value signal is applied globally to all pixels in the array.

4) A n-bit data bus 5, common to all pixels in a single column, which carries the signals read out from the registers 3. Again, it is assumed herein that n=8, but this is not essential.

It will also be understood that the pixel array forms only a part of the whole imaging device, and there will be processing and control circuitry, including clock circuitry, external to the array, which handles the data from the array and controls the operation of the array. These components will be not described except in so far as they are necessary to an understanding of the invention.

Figure 2:
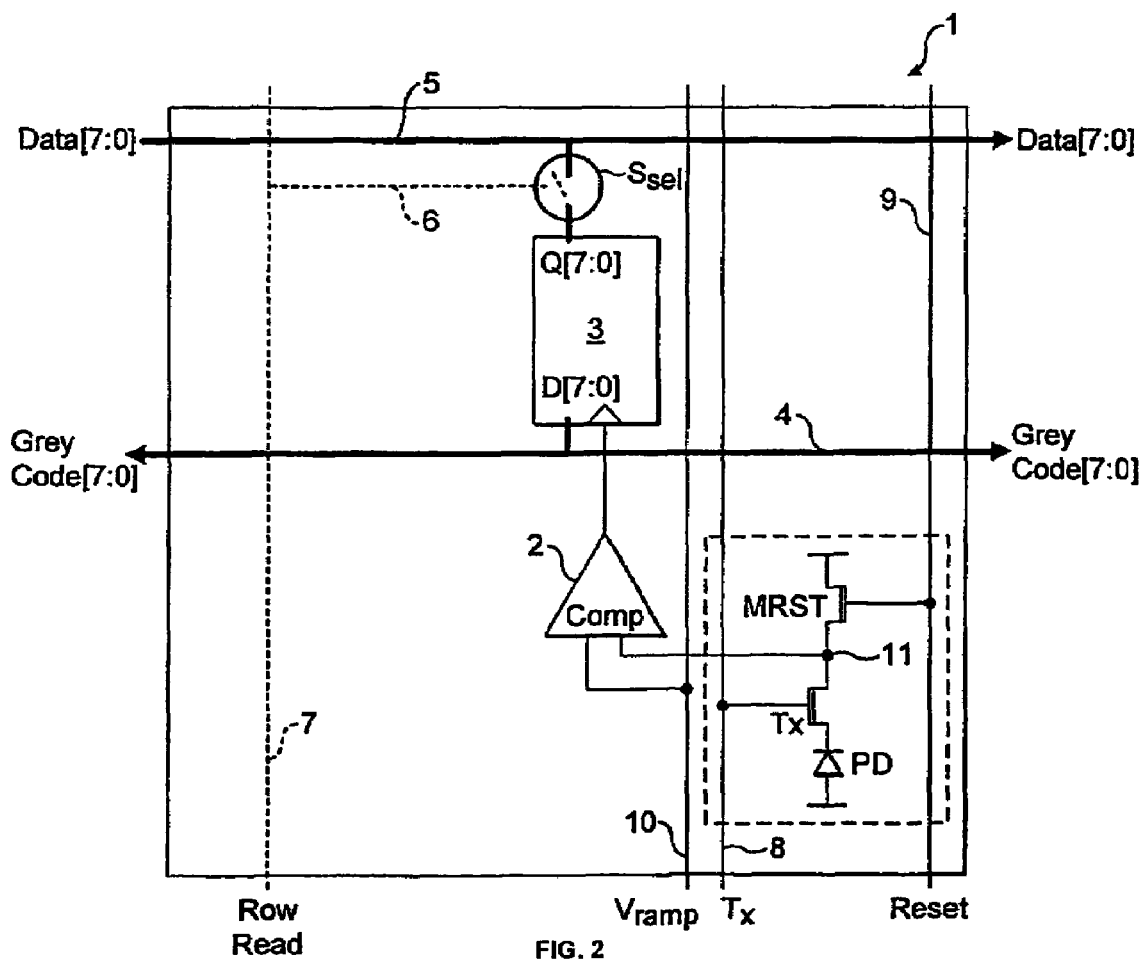
FIG. 2 is a circuit diagram of a known pixel circuit utilising DPS architecture.
Figure 3:
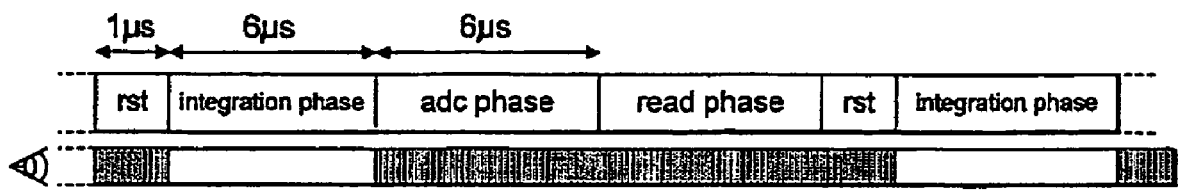
FIG. 3 is a timing diagram for the circuit of FIG. 2.
Figure 5:
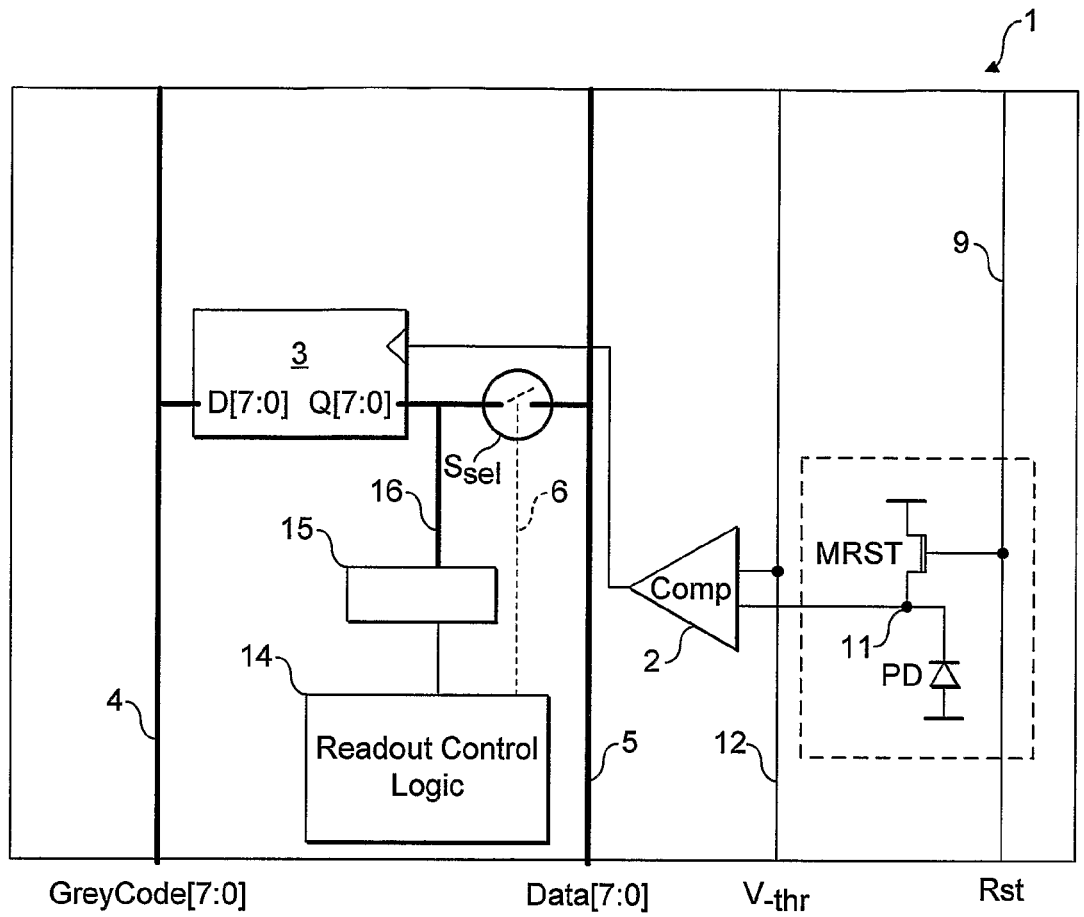
FIGS. 5, 7 and 11 are circuit diagrams of a digital pixel sensor for measuring the timing of incident radiation, according to three different embodiments of the invention.

Referring now particularly to FIG. 5, it will be seen that the circuit is very similar to that of FIG. 2 and the present description will thus concentrate on the differences.

The main difference is that the circuit is able to measure the timing of an external event resulting in the sensor, in the form of a photodiode PD, receiving a sudden burst of radiation from, for example, a photon splash, X-ray or charged particle. This results in a sudden drop in the amplitude of the voltage at node 11 which latter is set, at the beginning of the frame, to $V_{DD}$ or some other positive voltage by applying a reset signal rst, as described above.

The transfer transistor $T_x$ of FIG. 2 is not present because it is necessary to continuously monitor the output of the photodiode, rather than taking an integral over a period. It will thus be seen that, if an event causes the amplitude of the voltage at node 11 to fall below the threshold value $V_{thr}$ on reference voltage line 12, the output of the comparator 2 will change state, thus disabling the register 3, and causing the instantaneous digital value on the bus 4 to be stored in the register until it can be read out. The register 3 may take any suitable form; the particular register used is one containing embedded DRAM cells.

The read switch $S_{sel}$ is controlled by a signal along the line 6 from a readout logic circuit 14. The logic circuit 14 is in turn controlled by tokens, each passed down a respective column of pixels from row to row of pixels. Readout from a particular pixel can only occur if the circuit 14 has the token. This type of token-based readout is described in more detail below.

The readout control circuit 14 is also controlled by a hit flag generator 15. This circuit receives input from a data bus 16 connected to the data output of the register 3. If the register contains its reset value of all zeros, it is assumed that no hit occurred, and the hit flag generator outputs a zero. If the register contains a value other than zero, indicating that a hit has occurred, then the hit flat generator outputs a logical 1.

The readout circuit operates in such a way that a signal is sent along line 6 to switch $S_{sel}$ only if a token is present AND a logic 1 is received from the hit flag generator 15. This will be explained in more detail below.

Figure 6:
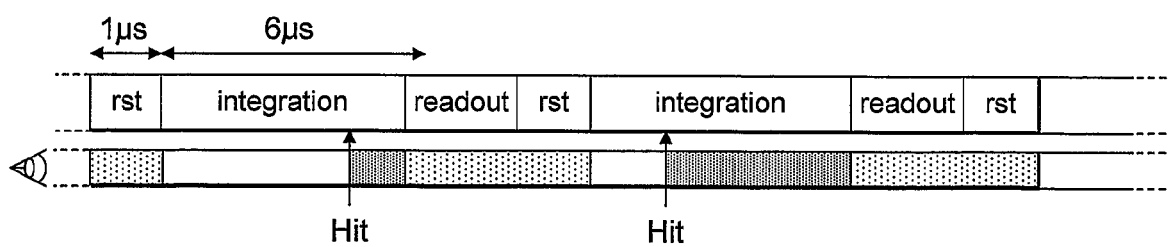
FIGS. 6, 8 and 12 are timing diagrams for the circuits of FIGS. 5, 7 and 11 respectively.

The operation of the circuit of FIG. 5 will be explained in more detail with reference to the timing diagram in FIG. 6. Immediately preceding the commencement of each frame, the photodiode PD is reset by way of a reset signal on line 9, as explained previously. At the same time, the Gray code generator is reset. After reset, the monitoring period commences, during which the amplitude output voltage at the node 11 falls from the level set at reset as radiation is incident on the photodiode. If no radiation occurs, the voltage remains at approximately the level set at reset due to capacitance effects inherent in the circuitry, or due to the addition of a storage capacitor (not shown). The primary purpose of the circuit shown is to detect sudden external events in a background radiation which is either at a very low or zero level. The external event causes a rapid burst of radiation to be incident on the photodiode which causes a corresponding rapid fall in the amplitude of the voltage on node 11. If the fall is sufficient, the voltage at the lower input to comparator 2 falls below the d.c. level on the reference voltage line 12, thus causing the output state of comparator 2 to change, as explained previously. For example the output of the comparator might be set to be normally at logic 1 level but, at the moment of crossover, the output logic level falls to zero, thus disabling the register 3. It will be seen that the moment in time at which this happens corresponds to the time from the beginning of the frame at which the event took place. In the meantime, the digital value on data bus 4 has been rising from its reset at the beginning of the frame and therefore the digital value which is stored in the register 3 at the instance of the change of state of the comparator output from logic 1 to logic 0 is representative of the timing of the event, or hit, from the beginning of the monitoring period.

Once a hit occurs, nothing further happens before the end of the monitoring period, which is fixed. During this time, and indeed for the rest of the frame, the photodiode is effectively blind to the radiation since, even if further events occur during this time, they are not detected by the circuit.

At the end of the monitoring period readout occurs on a pixel-by-pixel basis. The readout control circuit will close switch $S_{sel}$ when it is the turn of the pixel to read out, provided that the flag generator 15 indicates that there has been a hit during the monitoring period. The exact mechanism of readout will be explained in more detail below.

At the end of the readout of all pixels, the frame ends, and the circuit is reset, as aforesaid. FIG. 6 illustrates 2 complete frames, and the start of a third. Each frame comprises a monitoring period followed by a readout period, and with a reset period in between. In the first frame, there is a hit near the end of the monitoring period and in the second frame there is a hit near the beginning of the monitoring period.

Figure 7:
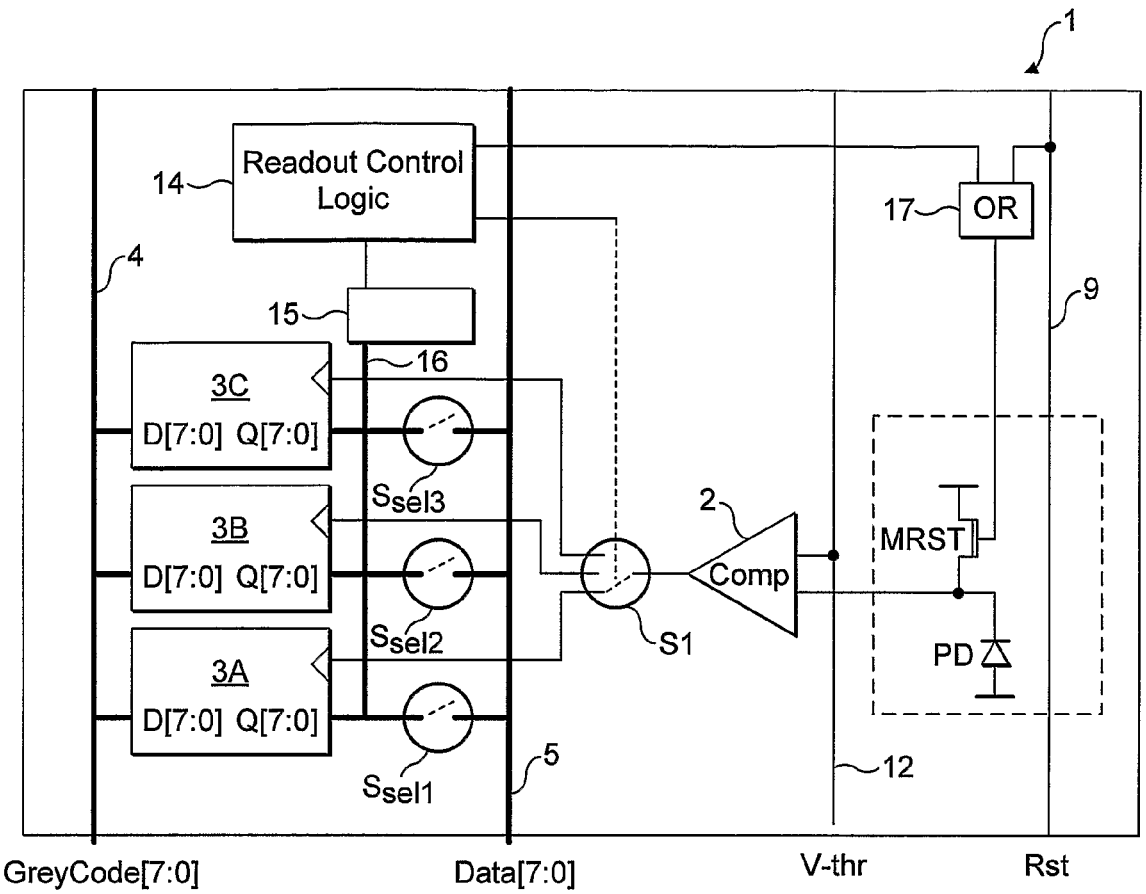

FIG. 7 illustrates a variant of the circuit of FIG. 5 in which multiple—in this case up to 3—external events may be detected within the monitoring period.

This is achieved by providing 3 registers 3A, 3B and 3C connected to the output of the comparator 2 via a 3-way selector switch S1 controlled by the readout control circuit 14. The switch S1 is operated sequentially to enable each one of the registers in turn to store timing information for up to three hits. The hit flat generator 15 receives the data output from the register 3A, which is the first register to receive a hit, and will only generate a hit flag if there is a level stored in this register.

There is a small modification in the reset arrangements for the photodiode PD in that an OR gate 17 supplies the reset signal to the reset transistor MRST, this OR gate receiving input from the reset line 9, and from the readout control circuit 14. Thus a reset signal is applied to transistor MRST either if a global reset signal appears on line 9, at the beginning of the frame, or if a reset signal is Output from the readout control circuit. In this way a reset is issued each time the switch S1 is operated, corresponding to the detection of a hit. Note that only the photodiode is reset within the monitoring period— the Gray code generator continues running so that all hits are timed from the beginning of the frame.

Readout occurs by operation of respective selector switches $S_{sel1}$, $S_{sel2}$, $S_{sel3}$ which connect the 8-bit outputs of the respective registers 3A, 3B, 3C to the data bus 5. The selector switches are controlled by the readout control circuit 14 such that, upon receipt of a row readout token, the three registers are read out sequentially onto the bus 5. Readout thus takes up 3 clock cycles.

Figure 8:
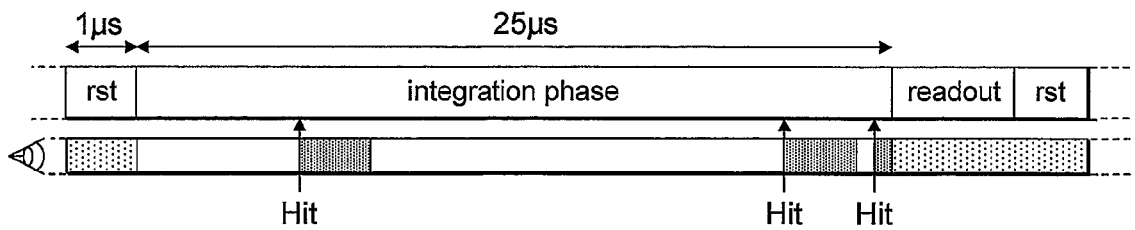

FIG. 8 illustrates the timing diagram for the circuit of FIG. 7, which will be clear given the explanation already provided. Only a single frame having an integration phase of 25 µs duration is illustrated.

Figure 9:
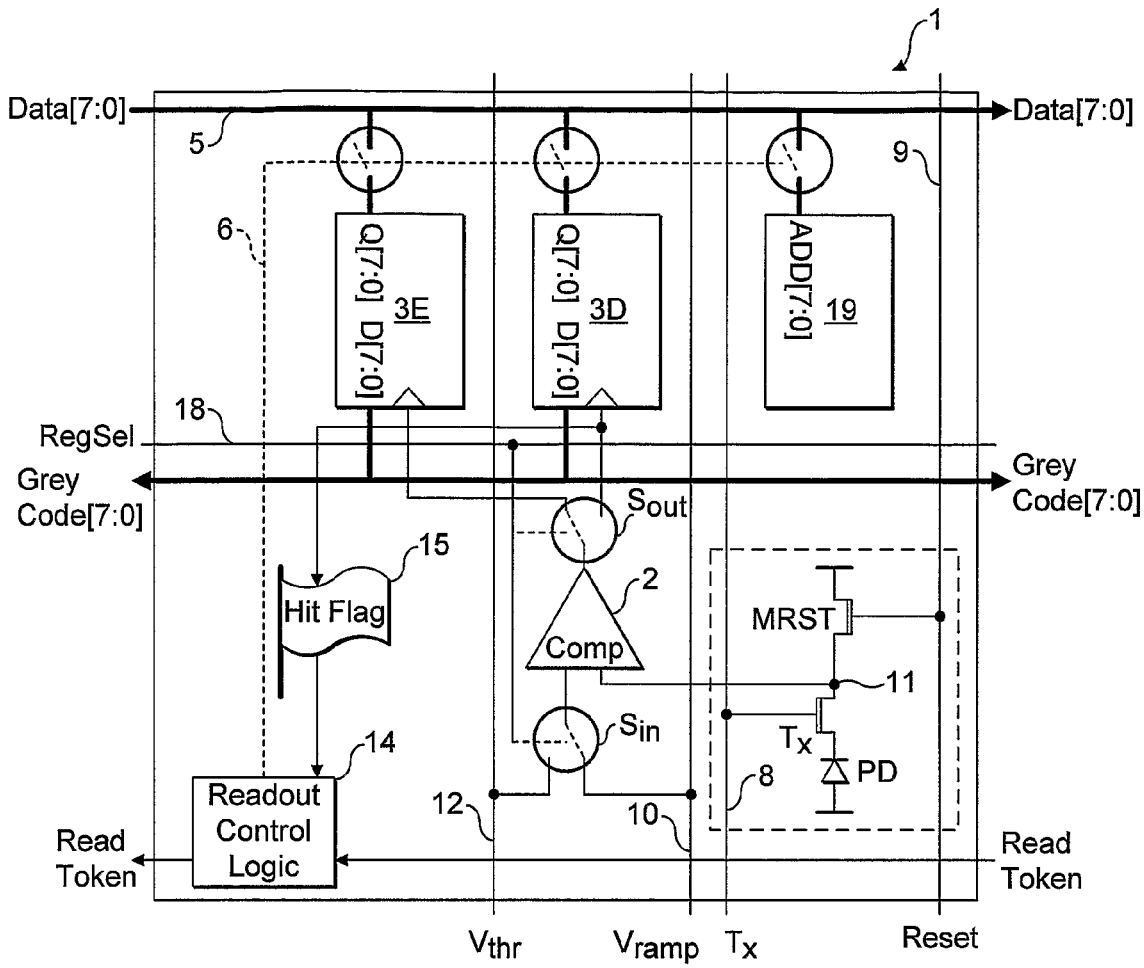
FIGS. 9 and 13 are circuit diagrams of a digital pixel sensor for measuring both the timing and amplitude of incident radiation, according to two different embodiments of the invention.

Reference is now made to the circuit of FIG. 9 which combines the ability both to measure the timing and amplitude of a single external event within a monitoring period. Thus, for example, this gives the ability to obtain information about the energy of electrons or X-rays incident on the photodiode, as well as information about their timing. The circuit will be largely understood by reference to FIGS. 2 and 5. Essentially the comparator 2 is switched backwards and forwards on a cyclic basis between two modes of operation: a timing mode and an amplitude mode.

To this end, selector switches $S_{in}$, $S_{out}$ are placed at the second input and the output respectively of the comparator 2 and these switches are operated simultaneously by means of a signal RegSel on a line 18 which is common to all pixels in the array.

The switch $S_{in}$ receives input from lines 10 and 12 and passes a selected one of these to the second input of the comparator. Thus the second input of the comparator received either a fixed reference voltage $V_{thr}$, or a ramp voltage $V_{ramp}$. The nature of both of these has already been discussed. The switch $S_{out}$ connects to the enable input of either one or the other of two registers 3D or 3E.

The hit flag generator 15 in this case receives input from the output of switch $S_{out}$ to indicate the occurrence, or otherwise, of a hit.

A further feature not shown previously is a ROM (read only memory) 19 which stores the unique address of the pixel within its column in order to enable it to identify itself during readout. This is necessary if a hit flag is used to select rows for readout, in order to enable the subsequent processing circuitry to identify which pixel the information on bus 5 is coming from. The ROM 19 is switched onto the data readout bus 5 when the readout token is received so that the ROM can be read out sequentially with the registers 3D and 3E. An 8-bit ROM is illustrated, which will enable addressing of up to $2^8$ rows; a ROM having a greater capacity can be used if there are more rows than this in the array.

Figure 4:
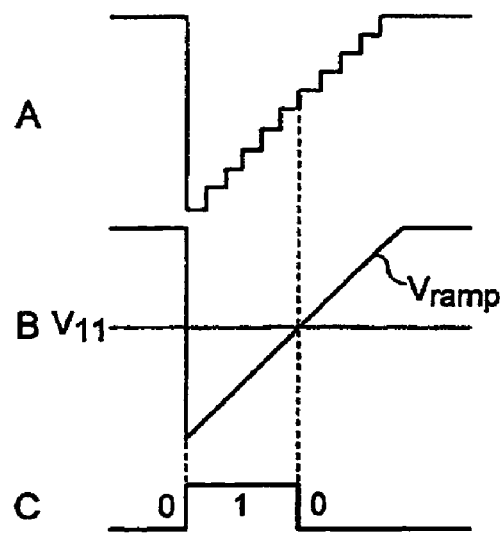
FIG. 4 is a diagram illustrating the waveforms at different parts of the circuit of FIG. 2.

With the switches $S_{in}$, $S_{out}$ in the positions shown, the comparator is in "amplitude" mode, with the $V_{ramp}$ voltage, synchronised with the Gray code values on bus 4 applied to the second input (see FIG. 4). In this mode, the circuit operates substantially in the same manner as described above in relation to FIG. 2, with the digital value representative of the amplitude of the photodiode voltage being stored in register 3E.

With the switches $S_{in}$, $S_{out}$ in the opposite positions to those shown, the comparator is in "timing" mode, with the fixed threshold voltage $V_{thr}$ applied to its second input. In this mode, the circuit operates substantially in the same manner as described above in relation to FIG. 5, with the digital value representative of the timing of the external event being stored in the register 3D.

Figure 10:
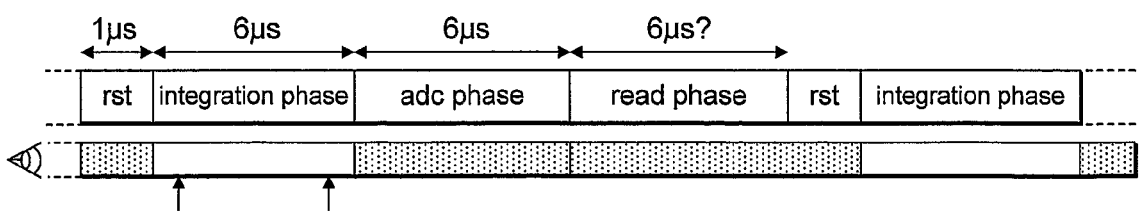
FIG. 10 is a timing diagram for the circuit of FIG. 9.

The sequence of operation will be described with reference to FIG. 10 which illustrates a single frame comprising an integration phase, an ADC phase and a read phase, together with just the integration phase of the next following frame.

The frame commences with a complete reset of the pixel— usually resetting the voltage at the cathode of the photodiode PD to $V_{DD}$ or some other user-controlled positive voltage, and resetting the Gray code generator to start counting at zero. The transfer transistor $T_x$ is switched on during reset to transfer the reset voltage to the photodiode cathode and remains on during the monitoring phase, until a hit is detected. The monitoring period starts with the switching off of the reset transistor MRST after the reset pulse. During the monitoring period the amplitude of the signal at node 11 will fall when radiation is incident on the photodiode PD, and this signal is passed to the first (right hand) input of comparator 2. During the monitoring period, the switching signal on line 18 causes switches $S_{in}$ and $S_{out}$ to be in "timing mode", so that the reference voltage line 12 applies a steady threshold voltage to the second (left hand) input of the comparator. In the event of a hit during the monitoring period, the output of the comparator 2 changes state, as described above, and a digital value representative of the timing of the hit from the reset at the beginning of the frame is stored in the register 3D.

At the end of the monitoring period, which typically lasts 6 µs, the transfer transistor switches off thus holding the voltage level at node 11. This voltage level is representative of the total amount of radiation incident on the photodiode PD integrated over the monitoring period. At the same time the $V_{ramp}$ signal is reset (see the description relating to FIG. 2) and the Gray code generator is also reset. The switching signal on line 18 now causes the ganged switches $S_{in}$ and $S_{out}$ to switch over to "amplitude" mode so that the ramp voltage $V_{ramp}$ is applied to the second input of comparator 2. As already described, at the point at which the ramp voltage $V_{ramp}$ reaches the same level as that held on node 11, the comparator output will change state, and a digital value representative of the amplitude of the voltage at node 11 will be written to the register 3E.

Thus, at the end of the ADC phase, the registers 3D and 3E hold digital values representative of the timing and amplitude respectively, of the external event.

The frame ends with the read phase, during which the contents of the registers 3D and 3E are read out in sequence, in the manner described above, upon receipt of a read token at the readout control circuit 14. Readout only occurs if the hit flag generator 15 indicates that a hit occurred during the monitoring period. If no hit occurs, the read token is immediately passed on to the next pixel in the column, otherwise the read token is retained until readout of the pixel is complete before being passed on.

Figure 11:
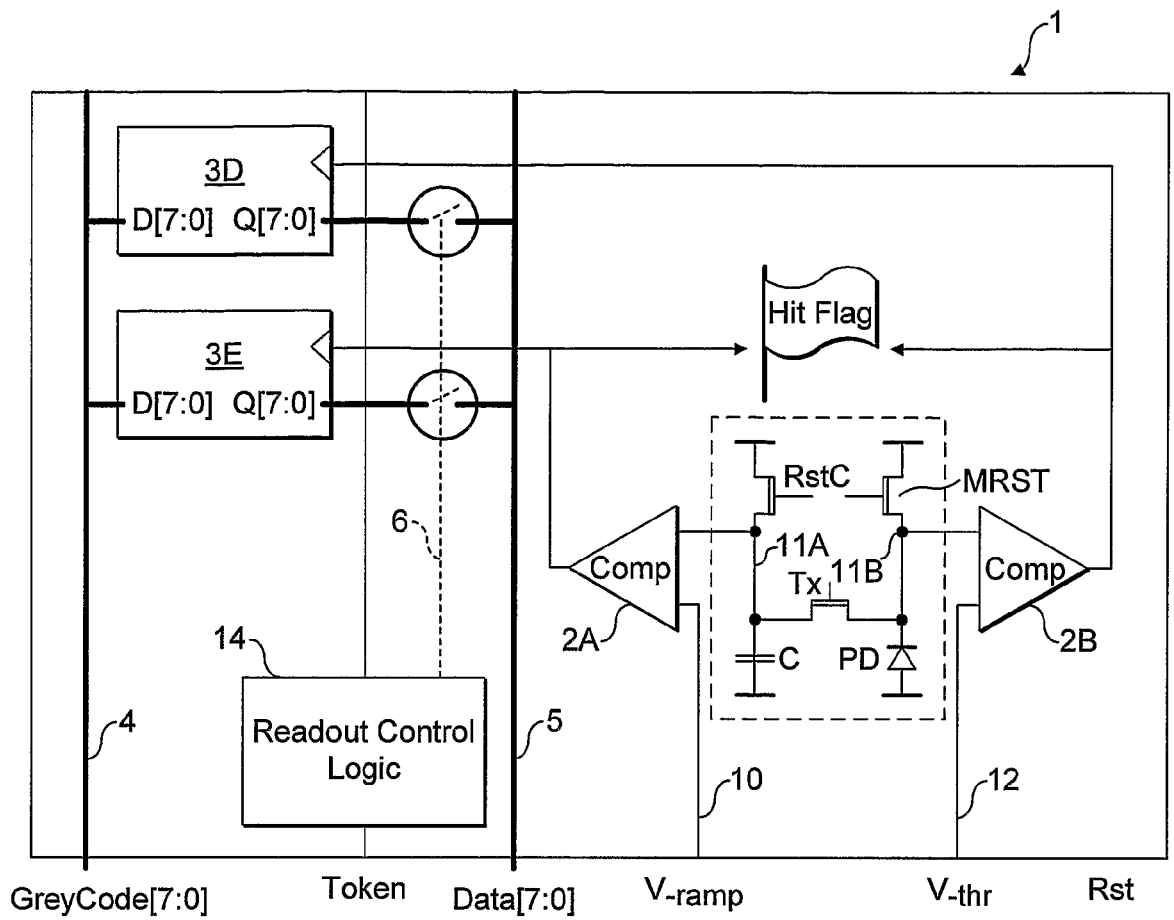

Reference is now made to the circuit of FIG. 11 which illustrates a pixel in which the "timing" and "amplitude" modes are handled by separate comparators 2B and 2A respectively to enable the pixel to simultaneously perform a ramp ADC with comparator 2A whilst looking for the next hit with comparator 2B.

The circuit details will be understood from the previous description. It will be noted that the outputs of the comparators 2A and 2B are passed to the enable inputs of respective registers 3E and 3D. the comparator outputs are monitored by the hit flag generator 15 to control the operation of the readout control circuit 14 at readout time. A capacitor C is provided to securely hold the voltage level at node 11A. Such capacitor may be realised entirely by stray capacitance, or may be constituted by a physical capacitor.

The operation of the circuit of FIG. 11 is now explained with reference to FIG. 12. At the beginning of the frame a reset pulse applies a positive reset voltage to the cathode of photodiode PD. The Gray code generator is likewise reset. During the monitoring period the transfer transistor is switched off and the instantaneous value of the voltage at node 11B is applied to the first input of the comparator 2B, to be compared with the fixed reference voltage on line 12. If a hit occurs during the monitoring period, the timing of this hit is saved as a digital value in register 3D in the manner described above. At the end of the frame the transfer transistor $T_x$ pulses on to transfer the value at node 11B to node 11A so that a ramp ADC can be carried out on it in comparator 2A, using the ramp voltage $V_{ramp}$ which is reset at this time. Meanwhile, once transfer transistor $T_x$ has turned off again a reset signal is sent to reset transistor MRST to reset the photodiode for a new monitoring period. Thus simultaneous with the ramp ADC being carried out on the hit from the first monitoring period, a second monitoring period is taking place to seek for more hits. If no hit occurs, then the ADC is powered down for the following monitoring period as it is not necessary.

Thus, at the end of each monitoring period, register 3D contains a digital value representing the timing of a hit found during that monitoring period, whilst register 3E contains a digital value representing the amplitude of a hit found during the immediately preceding monitoring period. These can be read out during a readout phase, following each monitoring phase, in the manner described above. The circuit then resets and the next frame commences.

Figure 13:
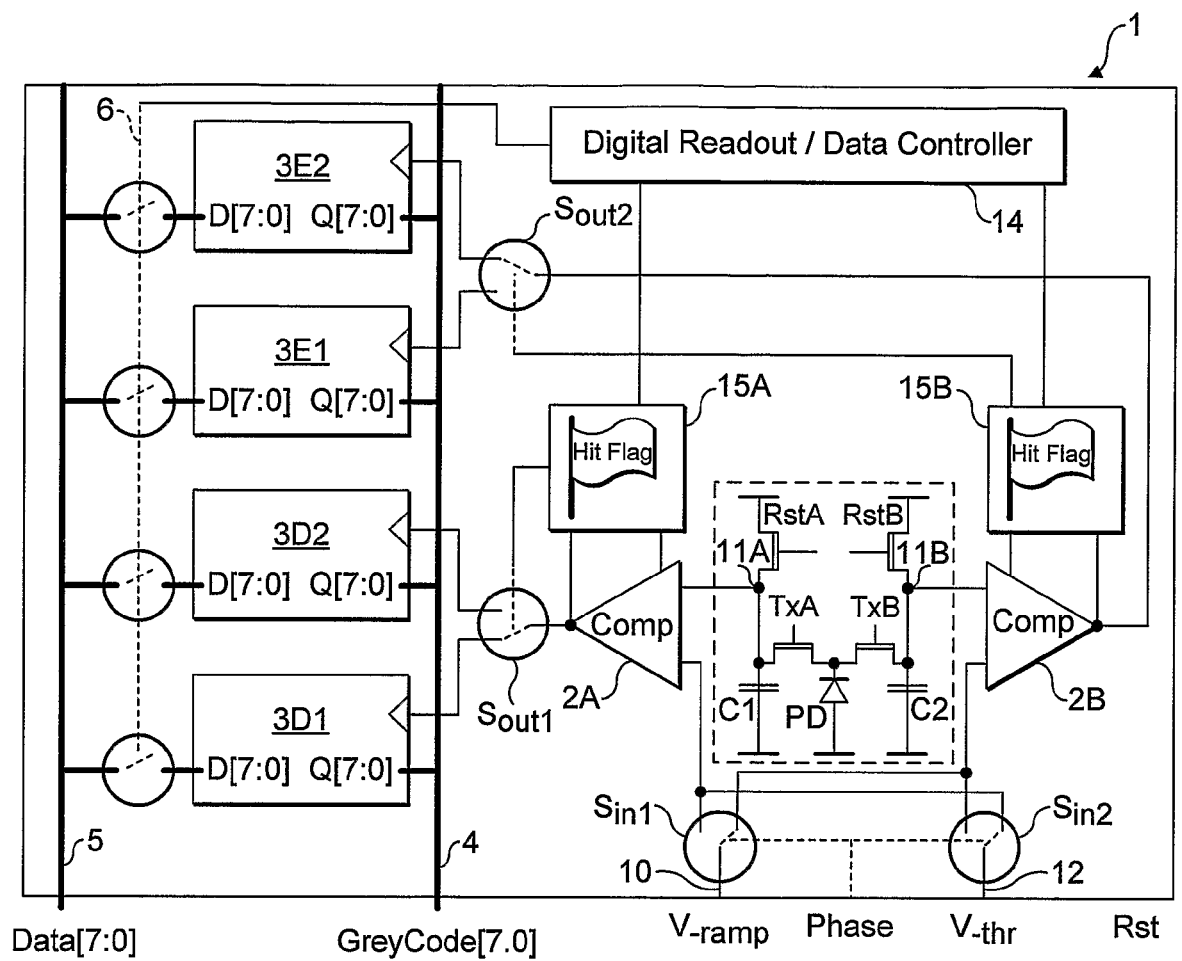

In the embodiment of FIG. 11, the reset node 11B and signal node 11A are reset separately and each will thus acquire a different kTC noise thus introducing a further error into the measurement. FIG. 13 shows a development of the circuit of FIG. 11 which has improved noise performance because a separate reset transistor and comparator is used for each of the two "samples" so the kTC noise for reset and sample are the same. As in the embodiment of FIG. 9, each of the comparators 2A, 2B can operate in "timing" mode or "amplitude" mode, depending upon the position of the input and output switches $S_{in}$ and $S_{out}$ and $S_{in}1$ and $S_{out}2$. The switches are linked in such a way that the comparators operate in the two modes alternately and such that, when one comparator is in "timing" mode, the other is in "amplitude" mode. Separate hit flag generators 15A, 15B are used to detect a hit in each frame, and used to control readout in the manner described above.

Reset of the photodiode at the beginning of each frame is achieved by simultaneously switching the reset transistor $R_{st}A$ and transfer transistor $T_xA$ on, or reset transistor $R_{st}B$ and transfer transistor $T_xA$ on, depending upon which comparator, 2A or 2B, is about to start its monitoring mode. The value input to the first inputs of the comparators 2A and 2B are held at nodes 11A, 11B respectively by capacitors C1, C2 which may be realised by stray capacitance or by physical capacitors. During the monitoring period for each comparator 2A, 2B the appropriate transfer transistor $T_{xA}$, $T_{xB}$ is switched on so that the voltage level at the cathode of the photodiode PD is transferred to the appropriate node 11A or 11B.

Four registers 3D1, 3D2, 3E1 and 3E2 hold the various digital values: registers 3D1 and 3D2 hold the timing values from comparators 2A and 2B respectively, while registers 3E1 and 3E2 hold the amplitude values from comparators 2B and 2A respectively. At the end of each monitoring period, the contents of the four registers are read out (provided that a hit occurred), in the manner described previously.

Figure 12:
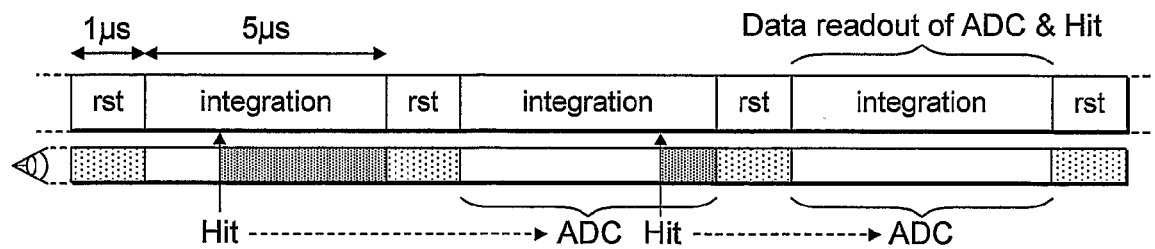

The operation of the circuit should be understood without further explanation, and with reference to the timing diagram of FIG. 12, which is also applicable to this circuit.

Figure 14:
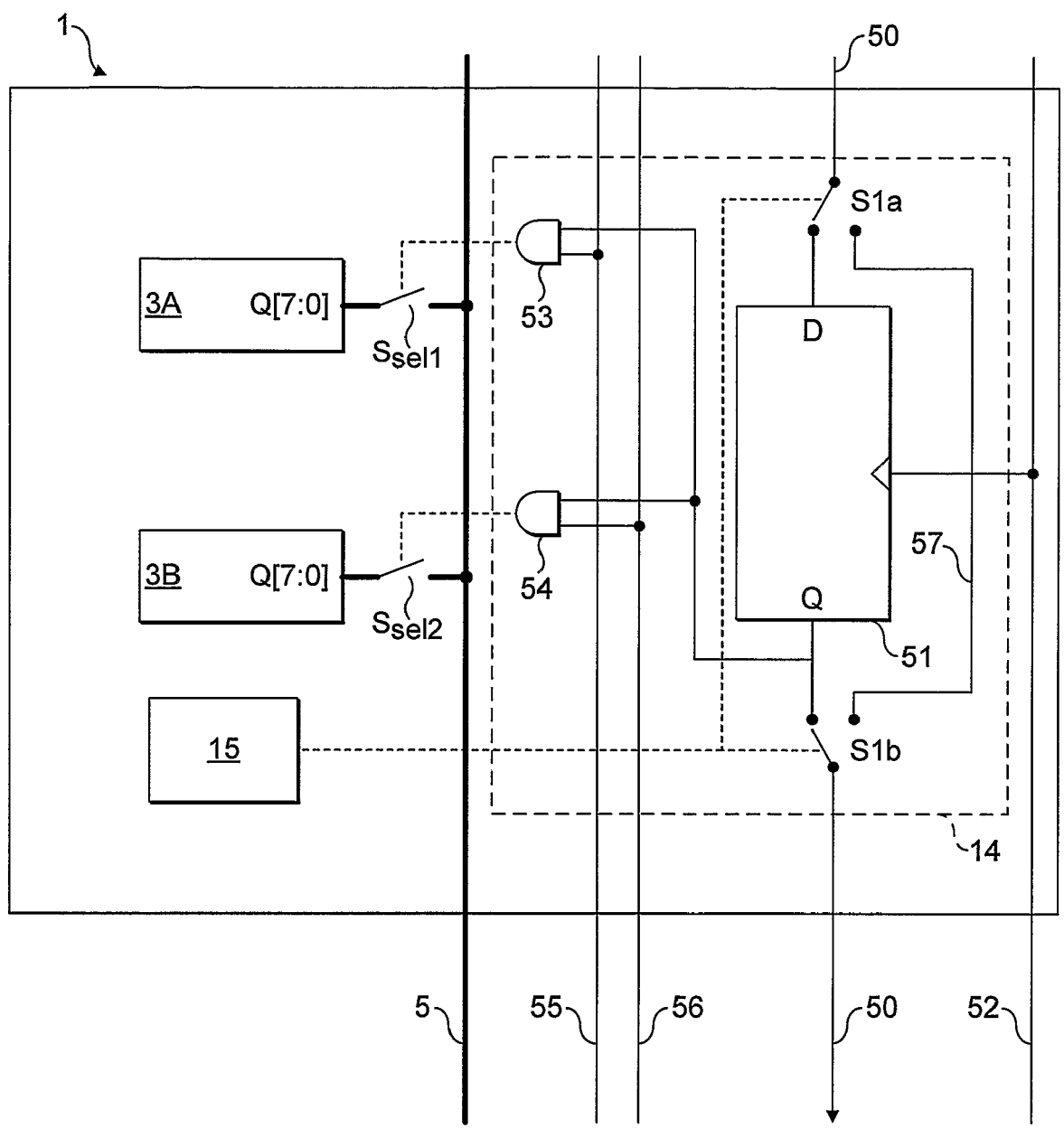
FIG. 14 is a view of a single pixel simplified to illustrate just those parts which are responsible for readout.

Reference is now made to FIG. 14 which shows a representative pixel 1 in which all but the readout circuitry has been removed for clarity. Two registers 3A, 3B are shown by way of example but it will be understood that the same principles apply to any number of registers from 1 upwards, and the same principle can be used for readout out from the ROM 19, shown in FIG. 9, and in fact with the readout arrangement about to be described, it is necessary for the pixel to have some means, such as a unique identifier stared in a ROM, to identify itself within its column.

An example of suitable circuitry for reading out from each pixel will now be described with reference to FIG. 14. It will be understood that this circuitry can be used with any of the embodiments described above by replacing the registers 3A and 3B with whatever arrangement of registers the embodiment has.

The purpose of the circuitry in FIG. 14 is to control the switches $S_{sel1}$ and $S_{sel2}$ to allow readout of the contents of registers 3A and 38 onto the data bus 5 on a sequential basis.

Readout from the array is controlled by a single bit signal, referred to as a token, which is passed down each column of the pixel array on a line 50. The token signals are generated externally of the array and one token is passed down each column, passing from pixel to pixel in that column. All of the token signals for all of the columns are issued simultaneously, at the start of the readout period but, as will become apparent, they will not necessarily propagate down the different columns at the same speed.

The line 50 passes into and out of the readout control logic 14 which is present in each pixel. The readout control logic 14 comprises a single bit shift register 51 which is clocked by the system clock on clock line 52. Ganged switches S1a and S1b control the passage of token signals into and out of the register 51. The Q output from the register 51 is connected to one input of each of two AND gates 53, 54 whose outputs control respective switches $S_{sel1}$ and $S_{sel2}$ to pass the contents of the respective registers 3A and 3B onto the data bus 5. The other inputs of the AND gates 53, 54 are connected to respective readout control lines 55, 56.

The switches S1a and S1b are operable to pass the token signal propagating down the line 50 either through the register 51, or via a by-pass line 57. The switches S1a and S1b are controlled by the hit flag generator 15.

The operation of the pixel readout circuitry will now be explained. The token usually comprises just a single pulse which is propagated down each column of pixels in the array on line 50. When the token reaches switch S1a it will be passed either to the register 51 or, via the by-pass line 57, straight to the next pixel down in the column. In the event that a hit occurred in the previous monitoring phase, the hit flag will be set to indicate this and the switches S1a and S1b will be switched by the hit flag generator 15 to the positions shown i.e. such as to pass the token to the register 51. If no hit occurred in the previous monitoring period, then the hit flag generator will switch the switches S1a and S1b over to the other position, whereupon the token will bypass the register 51, and propagate directly to the next pixel down in the column.

Assuming that a hit has occurred, the token is passed to the D input of the register 51 and awaits the next clock pulse on line 52. Upon receipt of this, the pulse is clocked through the register and is outputted via its Q output and passes, via switch S1b to the next pixel down in the column whereupon the process repeats itself. Meanwhile, the pulse which appears at the Q output of register 51 is also passed to an input of each of the AND gates 53, 54. The other inputs of the AND gates 53, 54 receive signals along readout control lines 55, 56. Thus, when each of the AND gates 53, 54 receive simultaneous signals on both of their inputs, they will output a signal which will close their respective switch $S_{sel1}$ or $S_{sel2}$ to pass the contents of the register 3A or 3B onto the data bus 5. In this way signals applied to lines 55 and 56 will allow the contents of the registers 3A and 3B to be passed onto the data bus 4 on a sequential basis, but only if the hit flag is set. It will be noted that the lines 55 and 56 are common to all pixels in each column, but data will be read out from only one pixel in each column at a time, depending upon where the token has reached. It will also be apparent that, where no hit is indicated, the pixel will not be read at all, and the token will propagate straight to the next pixel down in the column. This means that the different tokens propagating down the different columns of the array will not necessarily propagate at the same speed—those columns whose pixels record few hits will be read out much more quickly. This is why it is necessary for each individual pixel to be able to identify itself within its column—readout is not on a row-by-row basis, in which individual pixels can readily be identified by their row and column.

The outputs from the columns can be handled in various different ways. One example is that the outputs from the columns be passed, at each clock pulse, into the respective inputs of an 8 bit×N column FIFO register (not shown) where N is the number of columns. The subsequent processing of the signals does not form part of the present invention.

It will be clear to those skilled in the art that a form of column sense amplifier is necessary to correctly read the contents of register elements in the pixels from the bottom of the columns. This invention does not extend to the design of these amplifiers of which there are a number of commonly used techniques and circuits. The assumption is that the pixel register values are read and restored to full-rail digital signals at the column base, within some defined minimum clock period, and presented to the subsequent data-handling circuits.

In the above described embodiments, the digital values stored in the registers 3 have been read out sequentially. It would, however, be possible to realise simultaneous or parallel readout from a pixel's register, subject to additional circuitry such as bus routing and control logic.

It will be clear to those skilled in the art that further circuits could be created combining various of the features of the above-described circuits in different ways. Other variants include:

1) If in the timing measurements, one can, for example, set the threshold $V_{thr}$ at the saturation level. In this case, each pixel would output the time corresponding to the time it takes to get into saturation. Because of the speed of the sensor, this could be used to increase the dynamic range of the sensor beyond present limitations of CMOS sensors.

2) Two memories can be integrated in the basic pixel circuit of FIG. 5 to receive the sensor output signal before and after the reset, i.e. correlated double sampling (CDS).

Figure 15:
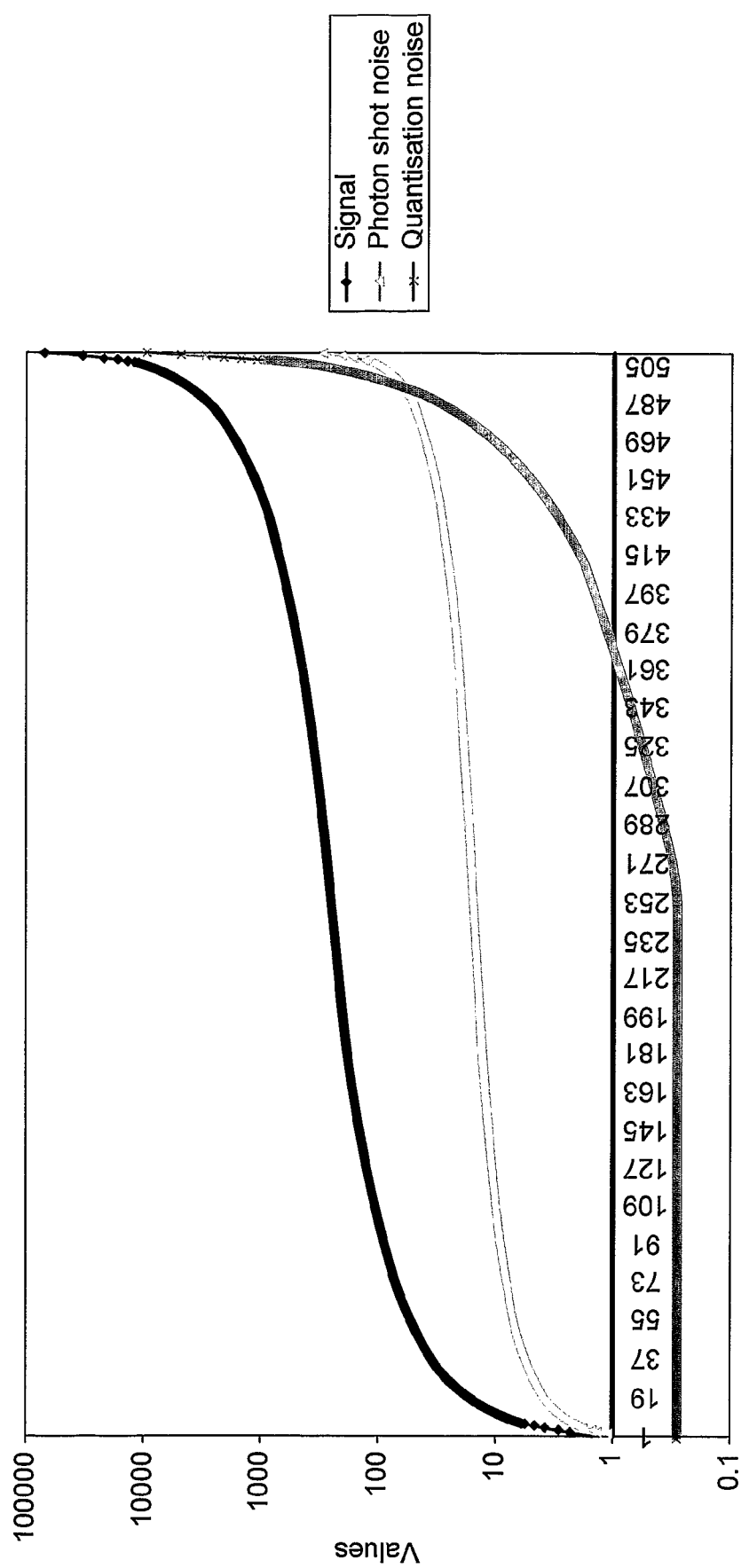
FIG. 15 is a graph of sensor output signal, photon shot noise and quantisation noise, as a function of quantised levels 0-505.

3) In the basic pixel circuit of FIG. 5, the timing can be adapted so that the pixel measures either the time it takes to reach saturation or, if this has not been reached during the monitoring period, the amplitude of the signal integrated during the integration time. If n bits are recorded, the output will be on n+1 bits, with the last bit flagging the type of measurement taken by the pixel. This way of functioning would provide high resolution on low signals and a coarser resolution on larger signals, but still provide an increased dynamic range. This is because large signals are affected by large intrinsic (shot) noise, and thus do not need to be converted with the same resolution as small ones. For example, suppose the operation of the pixel on 8-bit, and linear measurements of time and amplitude. Let us also suppose that the timing is such that, during a monitoring period T0, the clock runs up to 255 and that the corresponding saturation signal is S0. All signals S<S0, will be measured by the amplitude measurement at the end of the monitoring period. All signals S1>S0 will be measured by the time T1 they take to reach saturation. Supposing a linear time measurement, it holds that S1/S0=T0/T1 or S1=S0*T0/T1. It is clear that as S1 increases, the distance between two successive levels increases and as such so do the quantisation errors. However, because the photon shot noise is also increasing, the effect of the quantisation range on the dynamic range is negligible. In FIG. 15 and as a function of the quantised levels, we show:

a) the signal; note that levels above 255, correspond to time measurements. Note also that the time measurement would give smaller numbers for higher signal levels.

b) quantisation errors. This is constant for levels up to 255 (amplitude measurement) and then increases.

c) photon shot noise, considered as the square root of the number of electrons.

The important point is the cross-over between curves b) and c). It can be considered that each source of noise, which is at least 3 times less than the main noise, has a negligible effect on the noise (uncorrelated noise sources add in quadrature). If we use this relationship, the quantisation levels can be neglected for signals up to 2330, thus achieving an equivalent number of bits of over 11. The net result is thus that, by adding 1 bit and using the time measurement during the integration, an increased dynamic range can be achieved. The advantage of this method over a linear method is in saving pixel space and reducing the conversion time, since we can consider that the most significant bits are measured during the integration. It is also understood that by varying the clocking sequence during the monitoring period, wider dynamic ranges could be obtained.

Some further features and advantages of the above-described invention will now be discussed.

1) The imaging device described above, by reading out only those pixels on a sensor array that are triggered by events, dramatically reduces data readout and analysis overheads in photon, ion and electron imaging applications.

2) The robust nature of the technology gives the potential for direct electron event detection and energy measurement that would in some applications remove the need for delicate and relatively slow image intensifiers.

3) MHz to GHz event rates will be possible before event pile up, orders of magnitude faster than current commercial CCD based readout.

4) A unique ability to time tag events to 10 nanosecond accuracy provides a means to time events for velocimetric (time of flight) measurements and correlation measurements not possible with current CCD or CMOS array sensors.

The demand for low noise, sensitive and high-speed array detectors continue to drive development of devices with wide use in analytical instrumentation, military, medical, space science, high energy physics and spectroscopy. In many of these applications single photon light level imaging is desirable but poses a fundamental challenge when there is a requirement to capture events at high frame rates. Due to readout noise direct single photon detection is not possible and in order to get round this problem it is necessary to amplify the signal. This is the method used routinely in image intensifiers but comes at the expense of degrading the S/N (signal to noise ratio) of the original photon signal. The counting mode is used in streak cameras, intensified charge coupled devices (ICCD's), and in electron and ion imagers (without the photocathode to convert light to electrons).

The advantages of the single photon (or single ion/electron) 'event counting mode' are that:

It alleviates the noise associated with conventional image intensifiers.

It removes the inherent noise and poor signal linearity associated with intensifiers, plus providing huge dynamic range, excellent linearity and almost zero readout noise.

It provides enhanced spatial resolution by allowing a statistical analysis of each event to measure its positional centre of gravity (centroid).

The principle of an image intensifier in event counting mode is as follows. Photons incident on a photocathode result in the emission of an electron that is amplified by the image intensifier to produce a splash 'event' of electrons that are converted to light by a scintillator. This light is imaged on to a CCD (or CID) and the image frame is transferred to a computer where signal processing first finds and then calculates the centroid of each event to give a highly accurate position on the photocathode for the original photon. The method is seriously limited by the CCD (or CID) readout rate of large arrays since the whole array (of up to 1 M pixels) must be read to find the widely distributed photon events. Then, in order to avoid event pile up (image distortion due to event signal overlap on the sensor array), the CCD must be read before there is a significant probability (usually taken as ~100:1) that the events overlap. The frame rate of the camera and subsequent data processing and storage overheads then defines the total number of events per second read out. For video rate readout of a CCD this leads to a maximum event rate of typically less than $10^5$. The imaging device of the present invention circumvents these problems in the ways listed above, minimising data overheads to provide a potential for several orders of magnitude improvement in signal acquisition rate.

The invention claimed is:

1. An imaging device comprising an array of pixels in which, for each pixel, there is provided:

a sensor which is sensitive to a variable quantity to be imaged and for outputting a signal representative of the variation in said quantity during a monitoring period;

a comparator having a first input and a second input;

a connection for connecting the output of said sensor to said first input in such a way that said comparator continuously monitors said output signal; and a connection for applying a reference voltage to said second input;

said comparator being such as to change its output state at the point in time at which the amplitude of said output signal crosses said reference voltage level, wherein each pixel further comprises a hit flag generator which is operable to generate a flag signal indicative of whether, during the monitoring period, the output state of said comparator changes, and readout circuitry which is operable to read the contents of a memory unit during a read period, following the monitoring period, only if the hit flag generator indicates that the output state of the comparator changed during the monitoring period.

2. An imaging device as claimed in claim 1 wherein each pixel further comprises a memory unit operable to store a value representative of the said point in time at which the amplitude of said output signal crosses said reference voltage level.

3. An imaging device as claimed in claim 2 further comprising a counter unit which generates a steadily increasing or decreasing value during the monitoring period, which value is written to the memory unit at said point in time to thereby represent the timing of said point in time.

4. An imaging device as claimed in claim 3 further including a reset unit for resetting said counter unit at the beginning of the monitoring period so that the value stored in the memory unit is representative of the timing of said point in time with respect to the beginning of the monitoring period.

5. An imaging device as claimed in claim 4 wherein said counter unit is a Gray code generator for generating a steadily increasing digital value, and wherein said memory unit comprises a register for storing the digital value reached at said point in time.

6. An imaging device as claimed in claim 1 wherein said hit flag generator receives input from the output of said comparator such that said flag signal indicates a "hit" if the output state of the comparator changes during the monitoring period, but not otherwise.

7. An imaging device as claimed in claim 1, wherein said hit flag generator receives input from the output of said memory unit and wherein the flag signal is set to indicate a "hit" only if the memory unit contains a value other than a reset value.

8. An imaging device as claimed in claim 1 wherein said hit flag generator is set so as to indicate a "hit" only if the output state of the comparator changes within a certain range of times from the beginning of the monitoring period.

9. An imaging device as claimed in claim 1 wherein each pixel further comprises a memory unit for storing a unique value identifying the pixel within each column of the pixel array.

10. An imaging device as claimed in claim 1 wherein the reference voltage is a d.c. voltage which remains unchanged over time.

11. An imaging device as claimed in claim 1 wherein the reference voltage changes over the monitoring period in such a direction as to bring forward said point in time at which the amplitude of the sensor output signal crosses the reference voltage level.

12. An imaging device as claimed in claim 11 wherein said reference voltage changes over the monitoring period according to a law which tends towards making a quantity to be imaged having a particular value in intensity space have the same value as its corresponding value in time space.

13. An imaging device comprising an array of pixels in which, for each pixel, there is provided:
  a sensor which is sensitive to a variable quantity to be imaged and for outputting a signal representative of the variation in said quantity during a monitoring period;
  a comparator having a first input and a second input;
  a connection for connecting the output of said sensor to said first input in such a way that said comparator continuously monitors said output signal; and
  a connection for applying a reference voltage to said second input;
  said comparator being such as to change its output state at the point in time at which the amplitude of said output signal crosses said reference voltage level,
  wherein each pixel comprises a plurality of memory units, wherein the output of the comparator is connected to a multi-way switch which is operable to connect the output of the comparator to one of said memory units at a time, and wherein a reset unit is provided for resetting the output of said sensor after a change of state of the comparator output so that a further change of the output state of the comparator within the monitoring period can be detected, said multi-way switch being controlled in such a way as to store timing information relating to each change of the output state of the comparator within the monitoring period in a separate one of said memory units.

14. An imaging device comprising an array of pixels in which, for each pixel, there is provided:
  a sensor which is sensitive to a variable quantity to be imaged and for outputting a signal representative of the variation in said quantity during a monitoring period;
  a comparator having a first input and a second input;
  a connection for connecting the output of said sensor to said first input in such a way that said comparator continuously monitors said output signal; and
  a connection for applying a reference voltage to said second input:
  said comparator being such as to change its output state at the point in time at which the amplitude of said output signal crosses said reference voltage level,
  wherein each pixel further comprises amplitude measurement circuitry for measuring the amplitude of the output signal from the sensor at the point in time at which the amplitude of the output signal crosses said reference voltage level, and a memory unit for storing a value representative of the amplitude of the output signal from the sensor, and
  wherein each pixel further includes a switching circuitry means associated with said comparator for causing said comparator to operate in one of two modes:
  a) a "timing" mode in which said reference voltage level is constant and said second input to the comparator is connected to receive said reference voltage level, and said output is connected to said memory unit; or
  b) an "amplitude" mode in which said second input to the comparator is connected to receive a ramp voltage to cause the comparator to operate as a ramp ADC, and said output is connected to said memory unit
  and a control unit for switching the comparator to "timing" mode at the beginning of the monitoring period, and switching to "amplitude" mode in the event that the comparator output changes state, thus enabling the analogue value of the amplitude to be stored as a digital value, by means of the ADC action of the comparator, in said memory unit.

15. An imaging device as claimed in claim 14 wherein the control unit is such as to switch the comparator to "amplitude" mode immediately upon a change of state of the comparator output so that the amplitude value stored in the memory unit is representative of the variation in said quantity from the beginning of the monitoring period to the point in time at which the amplitude of said output signal crosses said ramp voltage.

16. An imaging device as claimed in claim 14 wherein the control unit is such as to switch the comparator to "amplitude" mode at the end of the monitoring period, only provided that, during the monitoring period, the output of the comparator has changed state, so that the amplitude value stored in the memory unit is representative of the variation in said quantity over the whole monitoring period.

17. An imaging device comprising an array of pixels in which, for each pixel, there is provided:
  a sensor which is sensitive to a variable quantity to be imaged and for outputting a signal representative of the variation in said quantity during a monitoring period;
  a comparator having a first input and a second input;
  a connection for connecting the output of said sensor to said first input in such a way that said comparator continuously monitors said output signal; and
  a connection for applying a reference voltage to said second input;

said comparator being such as to change its output state at the point in time at which the amplitude of said output signal crosses said reference voltage level, wherein each pixel further comprises amplitude measurement circuitry for measuring the amplitude of the output signal from the sensor at the point in time at which the amplitude of the output signal crosses said reference voltage level, and a memory unit for storing a value representative of the amplitude of the output signal from the sensor, and wherein each pixel includes a further comparator whose output is connected to said memory unit, whose first input is connected to receive the output signal of said sensor and whose second input is connected to receive a ramp voltage so as to cause the further comparator to operate as a ramp ADC to enable the analogue value of the amplitude of the sensor output signal to be stored as a digital value in said memory unit.

18. An imaging device as claimed in claim 17 wherein each pixel further includes switching circuitry associated with said comparators for causing each comparator to operate in one of two modes:

a) a "timing" mode in which said reference voltage level is constant and the second input to the comparator is connected to receive said reference voltage level, or b) an "amplitude" mode in which said second input to the comparator is connected to receive said ramp voltage to cause the comparator to operate as a ramp ADC and a control unit for switching said comparator to "timing" mode and said further comparator to "amplitude" mode at the beginning of a first monitoring period, and for switching said comparator to "amplitude" mode and said further comparator to "timing" mode at the beginning of the next following monitoring period, and so on in a repeating sequence.

19. An imaging device as claimed in claim 18, wherein each pixel further includes further switching circuitry connected to the outputs of said comparators and operable to switch each comparator output to a respective one of a pair of memory units according to whether the comparator is in "timing" mode or "amplitude" mode.

* * * * *